United States Patent Office 2,927,932
Patented Mar. 8, 1960

2,927,932

PRODUCTION OF QUINONES AND PHENOLS

Robert William Gunn Preston, Norton-on-Tees, England, assignor to Imperial Chemical Industries Limited, London, England, a corporation of Great Britain.

No Drawing. Application May 18, 1956
Serial No. 585,616

Claims priority, application Great Britain July 6, 1955

5 Claims. (Cl. 260—396)

This invention relates to the production of phenols.
According to the present invention, there is provided a process for the production of phenols having a structure:

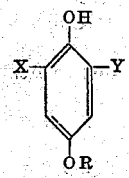

in which X and Y are tertiary alkyl groups and R is an alkyl or substituted alkyl group, which comprises the steps of reacting an hydroxy aldehyde having a structure:

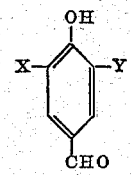

with hydrogen peroxide in the presence of an aqueous solution of an alkali metal hydroxide and in the presence of a gas containing free oxygen, to give a quinone having a structure:

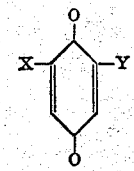

reducing this quinone to give a hydroquinone having a structure:

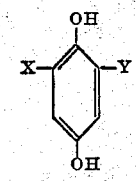

and subsequently alkylating this hydroquinone.

Thus, by the process of the present invention, 2:6 di-tertiary butyl-4 methoxy phenol may be produced from 3:5 di-tertiary butyl-4-hydroxy benzaldehyde. In the present application, this process will be described in detail to illustrate preferred operating features. Thus, 3:5 di-tertiary butyl-4-hydroxy benzaldehyde may be dissolved in dilute aqueous sodium hydroxide containing, for example, 5% by weight of NaOH. This solution is maintained at a temperature of 40° to 50° in the presence of air, and hydrogen peroxide is then added, the molar ratio of $H_2O_2$:hydroxy aldehyde being of at least the order of 1:1. 2:6 di-tertiary butyl parabenzoquinone is precipitated as a yellow solid. This compound is then reduced to 2:6 di-tertiary butyl hydroquinone by treatment, for example, with zinc and acetic acid. The 2:6 di-tertiary butyl hydroquinone is alkylated to 2:6 di-tertiary butyl-4 methoxy phenol by treatment with dimethyl sulphate in the presence of dilute aqueous sodium hydroxide.

As already stated, phenols of the type:

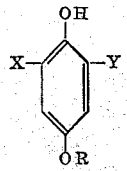

may be produced by the process of the present invention. The groups X and Y are tertiary alkyl groups, and may be identical or different; in general, however, it is preferable for X and Y to be identical, since the starting material is then more readily accessible. The group R may be any alkyl group or may be a substituted alkyl group such as benzyl.

In carrying out the process of the present invention, the molar ratio of hydrogen peroxide to hydroxy aldehyde should preferably be at least 1:1. The reaction is conveniently carried out in the presence of air; this may be passed through the reaction mixture, or the reaction may merely be carried out in a vessel open to the atmosphere. In this step, a dilute aqueous alkali is present; preferably a stoichiometric excess is maintained over the amount of hydroxy aldehyde employed.

In the first step of the present process, a 2:6 di-tertiary alkyl parabenzoquinone is formed. In the second step, this is reduced to a 2:6 di-tertiary alkyl hydroquinone. This reduction may be effected catalytically, for example by the use of a copper catalyst and hydrogen, or non-catalytically, for example by the use of a reagent which liberates nascent hydrogen, such as zinc and a dilute mineral or organic acid.

The 2:6 di-tertiary alkyl hydroquinone is converted to a 2:6 di-tertiary alkyl-4 alkoxy phenol in any convenient manner; for example, it may be reacted with an alkyl halide or a dialkyl sulphate in the presence of dilute aqueous alkali such as sodium hydroxide.

The 2:6 di-tertiary alkyl 4-alkoxy phenols produced by the process of the present invention may be employed as stabilisers for organic compounds liable to deterioration arising from peroxide formation. Compounds which may be stabilised in this manner are, for example, aldehydes such as nonaldehyde, ethers, petrols, lubricating oils and oils of animal or vegetable origin.

*Example*

57 ml. of 6% hydrogen peroxide (0.1 M) were added to a solution of 23.4 gm. (0.1 M) of 3:5-di-tertiary butyl-4-hydroxy benzaldehyde dissolved in 600 ml. of 4% aqueous sodium hydroxide maintained at 40 to 50°. Air was blown through the reaction mixture and a yellow precipitate of 2:6 di-tertiary butyl parabenzoquinone was formed. By operating in this way, 17.5 grams of 2:6-di-tertiary butyl parabenzoquinone were formed, corresponding to a yield of 79%.

10 gm. of the quinone produced as described above were reduced with zinc and acetic acid. The solution when colourless was poured on to crushed ice and the precipitated 2:6 di-tertiary butyl hydroquinone was re-crystallised from petrol. It had a melting point of 114° C. The yield of this compound was almost theoretical.

11 gm. of 2:6 di-tertiary butyl hydroquinone was dissolved in 200 ml. of 5% aqueous sodium hydroxide, maintained at 50° C. under a nitrogen atmosphere, and 7.5 gm. dimethyl sulphate were added. A precipitate of 2:6 di-tertiary butyl-4-methoxy phenol was obtained and after stirring for 45 minutes, this compound was filtered off under a nitrogen atmosphere, washed with water and dried. The yield was 7.5 gm. (65%). After recrystallisation from methanol this compound melted at 103–104° C.

I claim:
1. A process for the production of quinones having the structure:

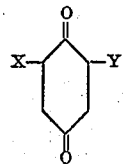

wherein X and Y are tertiary alkyl groups, which comprise the steps of reacting a hydroxy aldehyde having the structure:

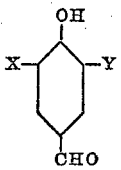

with hydrogen peroxide in solution in an aqueous solution of an alkali metal hydroxide and in the presence of air, whereby said quinone is produced.

2. The process of claim 1, wherein said alkali metal hydroxide is present in a stoichiometric excess over the amount of said hydroxy aldehyde.

3. The process of claim 1, wherein the molar ratio $H_2O_2$ to hydroxy aldehyde is at least 1:1.

4. The process of claim 1, wherein the reaction is carried out at a temperature in the range of about 40 to 50° C.

5. A process for the production of 2:6-di-tertiary butyl quinone which comprises the steps of reacting 3:5 di-tertiary butyl-4-hydroxy benzaldehyde with at least an equal molecular amount of hydrogen peroxide in aqueous solution in the presence of a stoichiometric excess of sodium hydroxide over the amount of said aldehyde at a temperature between about 40 to 50° C. and in the presence of air, whereby said quinone is produced.

References Cited in the file of this patent
UNITED STATES PATENTS

| | | |
|---|---|---|
| 2,417,919 | Fieser | Mar. 25, 1947 |
| 2,657,222 | Allen et al. | Oct. 27, 1953 |
| 2,722,556 | Young et al. | Nov. 1, 1955 |

OTHER REFERENCES

Metro: Journal of the American Chemical Society, vol. 77, p. 2901 (May 20, 1955).
Kharasch et al.: J. Org. Chem., vol. 22, p. 1440 (1957).
Yohe et al.: J. Organic Chemistry, vol. 21, pp. 1289–92 (1956).
Stillson et al.: Jour. Amer. Chem. Soc., vol. 67 (1945) pp. 303–307.
Richtzenhain et al.: Ber. Deut. Chem., vol. 82 (1949) p. 415.
Richtzenhain et al.: Chem. Abs., vol. 44 (1950) p. 1933 d, e.
Fieser et al.: Organic Chemistry (1950), p. 821.
D'Ans et al.: Berichte Deutsche Chemische Gesellschaft, vol. 48. Part 1), pp. 1141–1144 (1915).
Bickel et al.: J. of the Chem. Soc. (1953), pp. 3211; 3213; 3216.
Conant: The Chemistry of Organic Compounds, p. 401 Macmillan Co. (Revised Ed. 1939, 6th printing.)